United States Patent

[11] 3,597,110

| [72] | Inventor | Robert J. Corsmeier |
| | | Cincinnati, Ohio |
| [21] | Appl. No. | 868,723 |
| [22] | Filed | Oct. 23, 1969 |
| [45] | Patented | Aug. 3, 1971 |
| [73] | Assignee | General Electric Company |

[54] JOINT CONSTRUCTION
9 Claims, 8 Drawing Figs.

[52] U.S. Cl. .............................. 416/198,
151/69, 416/214
[51] Int. Cl. ..................................... F16b 43/00,
F01d 25/24
[50] Field of Search.......................... 416/198,
199, 200, 201, 214; 151/69

[56] References Cited
UNITED STATES PATENTS

| 1,853,162 | 4/1932 | Jacobi | 151/69 |
| 2,662,685 | 12/1953 | Blanc | 416/198 |
| 3,249,293 | 5/1966 | Koff | 416/198 |
| 3,478,802 | 11/1969 | Poccard | 151/69 |

Primary Examiner—Martin P. Chwadron
Assistant Examiner—C. Schimikowsky
Attorneys—Loren W. Peters, Derek P. Lawrence, Frank L. Neuhauser, Oscar B. Waddell and Joseph B. Forman ABSTRACT: A joint construction incorporating a coacting bolt head-flange structure is disclosed. The flange includes a surface for juxtaposition with a mating flange and a leg extending away from the juncture of the structures to be joined in a direction generally normal to the mated surface of the flange, the leg including a nominally flat surface facing the axis of a bolthole provided in the flange and further including a recess located adjacent the juncture of the leg with the primary portion of the flange. The bolthead includes a flat located in juxtaposition with the nominally flat surface of the flange leg, a pin projecting from the flat into the recess and movably secured in the bolthead, and means constraining the pin to remain interposed in the recess.

Patented Aug. 3, 1971 3,597,110
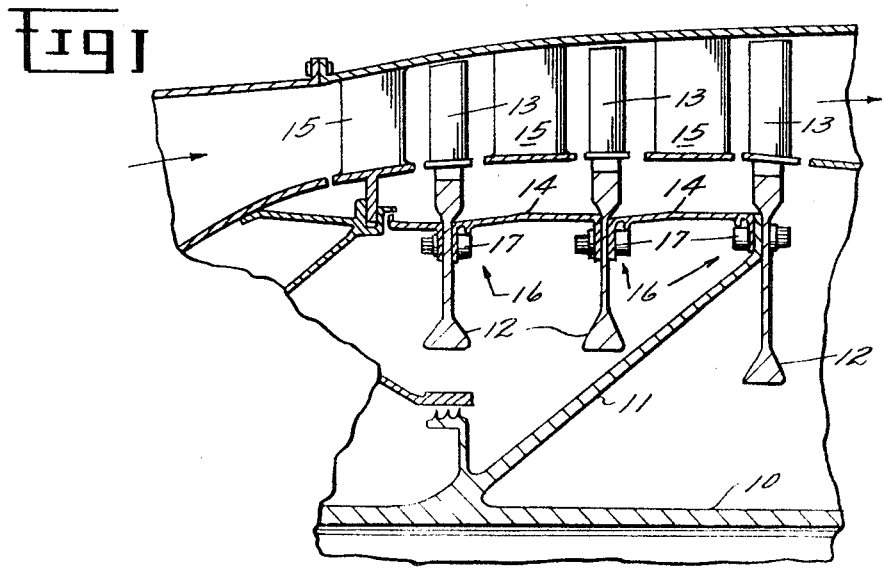
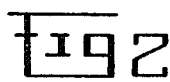
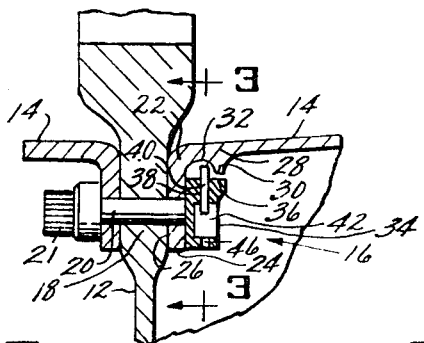
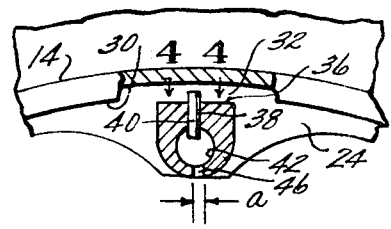
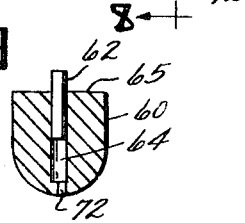
INVENTOR.
ROBERT J. CORSMEIER
BY Loren W. Peters
ATTORNEY—

3,597,110

JOINT CONSTRUCTION

BACKGROUND OF THE INVENTION

This invention relates to self-wrenching, self-retaining bolts and mechanical joints incorporating the same.

In constructing composite mechanical structures, physical space limitations or other mechanical limitations often require that structural joints be provided with threaded fasteners which can be secured in one of the adjoining structures before the other of the adjoining structures is assembled therewith. One such application is the stacked rotor of a gas turbine engine wherein disks and spacers in the form of cylindrical shells are alternately assembled to each other to form a complete rotor. Such an assembly process effectively precludes access to the head of a bolt placed in the spacer flange before the succeeding disk is placed over the bolt. This lack of access to the bolt raises two problems in the assembly process: (1) means must be provided to preclude the bolt from turning during the nut-tightening operation, and (2) further means must be provided to prevent the bolt from being pushed into the interior of the spacer during the step of placing the disk over the plurality of bolts extending through the spacer flange. The first-mentioned problem can be alleviated by having a flat on the bolthead juxtaposed with a mating flat surface in the interior of the spacer; however, the second-mentioned problem requires that means be provided to hold the bolt in its axial position after it has been inserted in the spacer flange. Several methods for accomplishing axial positioning of a bolt as described are available in the art; however, these means possess to varying degrees problems of design and manufacturing complexity, limited reliability or limited ability to remove the bolt for replacement after it has first been positioned and locked in place.

It is an object of this invention, therefore, to provide a combination bolt and flange which will accomplish the objectives of retaining the bolt in an axial position once it has been placed therein, constraining the bolt from turning when a nut is tightened down upon it, and permitting easy removal for replacement while at the same time providing the first two mentioned functions in a highly reliable manner.

BRIEF SUMMARY OF THE INVENTION

Briefly stated, the invention is a mechanical joint for joining two or more structural members, which joint comprises a first bolting flange on the first structural member having a hole extending therethrough and including a leg extending away from the juncture of the two structural members in a direction generally normal to the mated surface of the first flange, said leg including a nominally flat surface facing the axis of the hole and further including a recess located adjacent the juncture of the leg with the primary portion of the first flange. In combination with the flange described, a bolt is provided whose head has a flat located in juxtaposition with the flat surface on the flange leg, a pin projecting from the flat into the recess in the flange leg and movably assembled with the bolt, and means constraining the pin to remove interposed in the recess. The assembly of the pin with the bolthead is such that the pin may be positioned with its outer end flush with the flat and then repositioned to project into the recess after the bolt has been placed in position in the flange.

DESCRIPTION OF THE DRAWINGS

While the specification concludes with claims particularly pointing out and distinctly claiming the invention, it is believed that it will be better understood by reference to the discussion below and the accompanying drawings in which:

FIG. 1 is a fragmented section view of a turbine in a gas turbine engine;

FIG. 2 is a cross-sectional view showing a mechanical joint between three structural elements;

FIG. 3 is a section view taken along the line 3–3 of FIG. 2;

FIG. 4 is a partial view taken from line 4–4 of FIG. 3;

FIG. 5 is a partial section view of an alternate to the bolt shown in FIG. 2;

FIG. 6 is an elevation view of the pin shown in FIG. 5 as it appears before assembly with the bolt;

FIG. 7 is a partially sectioned view of a further embodiment of the bolt; and

FIG. 8 is a section view taken along the line 8–8 of FIG. 7.

DESCRIPTION OF THE PREFERRED EMBODIMENTS

As an illustration of the type of environment in which the invention finds particular utility, FIG. 1 shows a typical stacked turbine rotor assembly in the aft section of a gas turbine engine. The assembly includes a turbine rotor shaft 10, a conical member 11 connected to the shaft and assembled with the combination of disk 12 (which carries turbine blades 13) and spacer 14. Spacers 14 are included in the assembly to properly axially locate disks 12 and blades 13 in the engine assembly with respect to stators 15. Disks 12 and spacers 14 are assembled to each other, and to member 11, at joints 16 by means of fasteners 17. It is apparent from the drawing that, for example, assembly of the center disk 12 to the right spacer 14 precludes access to the inner end of the center fastener 17. Similarly access to the inner ends of the remaining fasteners 17 is made difficult or impossible upon assembly in the one instance of the left disk 12 to the left spacer 14 and in the other instance of the conical member 11 to the right spacer 14 and right disk 12. The present invention is a joint 16 configuration which obviates difficulties experienced in assembling the structure shown or similar structures wherein access to the fasteners is limited.

FIG. 2 illustrates the joint 16 in detail and includes disk 12 which has a bolting flange 18, spacers 14, a bolt 20 (which is one of a plurality of circularly spaced bolts 20 securing the members 12, 14 together and corresponds to the fasteners 17 shown in FIG. 1), and a nut 21 which is one of a plurality of nuts 21 threaded to bolts 20 and which in cooperation therewith clamp the structural members 12, 14 together.

Referring to FIGS. 2 and 3, spacer 14 includes at its end adjacent the bolthead an annular flange 22 which has a plurality of boltholes therethrough and further includes a primary portion 24 having a mated surface 26 juxtaposed with flange 18, a leg 28 extending in a direction generally normal to mated surface 26, a nominally flat surface 30 included on leg 28 (the term "nominally flat" including surfaces having a slight curvature such as the inwardly directed cylindrical surface which would result on a cylindrical spacer 14), and recess means 32 adjacent the juncture of primary portion 24 and leg 28 in alignment with the boltholes included in the primary portion 24 of flange 22. Recess means 32 can comprise a plurality of blind holes having their axes normal to surface 30 and intersecting the axes of said boltholes, or can comprise an annular groove.

Each bolt 20 includes a head 34 which is generally D-shaped, although it may have a variety of other shapes, and includes a flat 36 juxtaposed with the nominally flat surface 30 of flange 22. A hole 38 for receiving pin 40 is located in head 34 and originates on flat 36, hole 38 extending radially of the bolt into a blind hole 42 which extends into head 34 from the bolt's end. Pin 40 is moveable in hole 38 with the application of a light force axially thereof and is maintained in its position in hole 38 by a light interference fit. Referring to FIG. 4, one means for controlling the interface stress between pin 40 and hole 38 is to use what is commonly referred to as roll pin for pin 40, the roll pin comprising a generally cylindrically shaped shell of spring material having a groove 44 through one wall of the cylinder along its length.

Head 34, hole 38, pin 40 and blind hole 42 are sized so that pin 40 may be pushed axially into hole 38 until its end is flush with flat 36. Additionally, the components recited are sized so that when pin 40 is pushed fully into recess 32, the length of pin remaining in hole 38 is smaller than the diameter of blind hole 42. Head 34 additionally includes a hole 46 having a diameter smaller than that of hole 38 and pin 40 and being offset in amount *a* from the axis of pin 40 so that pin 40 cannot be pushed completely through head 34.

Assembly of joint 16 follows the following sequence. Pin 40 is first pushed into hole 38 on each bolt 20 so that it is flush with flat 36, and bolts 20 are then inserted in the holes in flange 22 until they are shouldered thereagainst. A small drift punch or similar tool is then inserted in each hole 46 and used to push against the inner end of each pin 40 and move its outer end fully into recess 32, where it will remain due to the interference fit between pin 40 and hole 38. Disk 12 and the left spacer 14 are then assembled over bolts 20, and nuts 21 and tightened down to clamp the structural members 12, 14 together. It is noted that the presence of pins 40 in recess 32 prevents the assembler from pushing bolts 20 back into the interior of the right spacer 14 as he places disk 12 and left spacer 14 over the bolt. Additionally, the juxtaposition of flats 36 with nominally flat surface 30 precludes the bolts from turning as the nuts 21 are tightened down upon them. Thus, there is provided a flange and bolt structure to facilitate assembly of structural members when access to a bolthead is either limited or precluded.

At times it may be desirable upon disassembly of the left spacer 14 and disk 12 from the right spacer 14 to remove a bolt 20 from flange 22. Removal is accomplished simply by tapping the threaded end of bolt 20 with a mallet and shearing pin 40 at flat 36, whereupon bolt 20 can be removed from flange 22 in the usual manner. Bolt 20 can thereafter be reused by using a drift punch to push the remaining portion of pin 40 into blind hole 42, removing the sheared pin 40 therefrom and inserting a new one. Alternatively, the remaining portion of pin 40 can be pushed outwardly with a drift punch inserted through hole 46 to remove it from head 34.

FIG. 5 illustrates an alternate bolthead 48 in which a blind hole 50 is provided with it axis normal to flat 51 and a smaller hole 52 extends from the bottom of hole 50 through the remaining portion of head 48. A pin 53, having a larger portion 54 sized to slide in hole 50 and a stem 56 sized to slide in hole 52 is located in head 48, spring-loaded outwardly by a spring 57, and retained by a swaged end 58 on stem 56, which is swaged after assembly of pin 53 with head 48. FIG. 6 illustrates the appearance of pin 53 before its assembly with head 48. The bolts shown in FIG. 5 are assembled with the flange 22 illustrated in FIG. 2, and are similarly disassembled therefrom, by retracting pin 53 against the force of spring 57 to clear nominally flat surface 30.

FIGS. 7 and 8 illustrate a still further embodiment of the bolt of this invention in which a roll pin 62 is disposed in a hole 64 which extends into the head 60 along an axis normal to flat 65.

A smaller hole 72 extends through the remainder of head 60 from the bottom of hole 64 to provide access to the inner end of pin 62 by a drift punch or similar device and is slightly offset with respect to hole 64. The bolt shown in FIG. 7 is assembled with the flange 22 of FIG. 2 by first pushing pin 62 into hole 64 until its outer end is flush with flat 65, inserting the bolt through the hole provided in flange 22 and shouldering it thereagainst, and inserting a drift punch through hole 72 and pushing against the end of pin 62 to push its outer end into recess 32. Disassembly of the bolt of FIG. 7 from flange 22 is accomplished in the same manner as disassembly of bolt 20 therefrom.

The joint construction described above may be used in any mechanical structure wherein access to bolts is limited and will exhibit the same advantages of ease of assembly, disassembly and reuse of bolts as are advantageous in the environment of a gas turbine engine.

Having thus described several embodiments of the invention, although not exhaustive of the possible equivalents, what is described to be secured by Letters Patent is as follows:

What I claim is:

1. A mechanical joint for joining a first structure which includes a bolting flange having limited accessibility to a second structure, said joint comprising:

a first bolting flange on said first structure having at least one hole extending therethrough, said first flange including a leg extending away from the juncture of the said two structures in a direction generally normal to the mated surface of said first flange, said leg including a nominally flat surface facing the axis of said hole and further including a recess means located adjacent the juncture of said leg with the primary portion of said first flange, said recess means being aligned with a line normal to said nominally flat surface and intersecting the axis of said hole;

a second flange on said second structure, said second flange including at least one hole extending therethrough;

at least one bolt extending through both said flanges and having a nut threaded thereon to clamp said flanges together; said bolt including a head thereon having a flat parallel to the bolt axis and located in juxtaposition with said nominally flat surface, a hole originating on said flat and extending partially through said head along a line normal to said flat, a pin disposed in said hole and moveable between a position in which its outer end is flush with said flat and a position in which its outer end projects from said flat into said recess means wherein said pin is maintained in any given position in said hole by an interference fit therewith, and a second hole in said head originating from the surface of said head opposite said flat and extending parallel with the axis of said first hole into communication therewith, wherein said second hole has a smaller diameter than said first hole, 2. The joint construction recited in claim 1 wherein said pin is a cylindrically shaped shell of thin spring material, said shell having a groove through its wall.

3. The joint construction recited in claim 1 including a spring urging said pin radially outwardly from the axis of said bolt.

4. The joint construction recited in claim 1 wherein the head of said bolt further includes a blind hole in the end thereof and extending thereinto along a line parallel to the bolt axis, said blind hole being in communication with said first-mentioned hole and said second hole.

5. A bolt which includes a head having a flat parallel to the bolt axis and which further comprises a hole originating on said flat and extending partially through said head along a line normal to said flat;

a pin disposed in said hole and moveable between a position in which its outer end is flush with said flat and a position in which its outer end projects from said flat, said pin being maintained in any given position in said hole by an interference fit therewith; and a second hole in said head originating from the surface of said head opposite the said flat and extending parallel with and slightly offset from the axis of said first-mentioned hole into communication therewith, said second hole having a smaller diameter than said first-mentioned hole.

6. The bolt recited in claim 5 wherein said head further includes a blind hole in the end thereof and extending thereinto along a line parallel to the bolt axis, said blind hole being in communication with said first-mentioned hole and said second hole.

7. A gas turbine engine rotor construction which includes a series of alternately disposed spacers and disks jointed by a plurality of disk to spacer joint constructions, each of which comprises;

a first bolting flange on said spacer having a plurality of boltholes extending therethrough, said first flange including a leg extending away from the juncture of a disk and spacer in a direction generally normal to the mated surface of said first flange, said leg including an inwardly directed cylindrical surface and further including recess means located adjacent the juncture of said leg with the primary portion of said first flange, said recess means intersecting the axis of each bolthole;

a second flange on said disk, said second flange including a plurality of boltholes extending therethrough and aligned with the boltholes in said first flange;

a plurality of bolts extending through said boltholes and each having a nut threaded thereon to clamp said flanges together; each bolt including a head thereon having a flat parallel to the bolt axis and located in juxtaposition with said cylindrical surface, a hole originating on said flat and extending partially through said head along a line normal to said flat, a pin disposed in said hole and moveable between a position in which its outer end is flush with said flat and a position in which its outer end projects from said flat wherein said pin is maintained in any given position in said hole by an interference fit therewith, and a second hole in said head originating from the surface of said head opposite said flat and extending parallel with the axis of said first-mentioned hole into communication therewith wherein said second hole has a smaller diameter than said first hole.

8. The joint construction recited in claim 7 wherein said pin is a cylindrically shaped shell of thin spring material, said shell having a groove through its wall.

9. The rotor construction recited in claim 7 wherein the head of said bolt further includes a blind hole in the end thereof and extending thereinto along a line parallel to the bolt axis, said blind hole being in communication with said first-mentioned hole and second hole.